United States Patent [19]

Bender

[11] 3,889,870

[45] June 17, 1975

[54] WELDED POLYESTER BAGS

[75] Inventor: Hugo Bender, Gerolzhofen, Germany

[73] Assignee: Hoechst Aktiengesellschaft, Germany

[22] Filed: Dec. 5, 1972

[21] Appl. No.: 312,271

[30] Foreign Application Priority Data

Dec. 7, 1971 Germany.............................. 2160497

[52] U.S. Cl. .................. 229/55; 53/30 S; 93/35 R; 206/497; 229/48 T; 229/87 F; 229/DIG. 12; 426/415
[51] Int. Cl............................................. B65d 33/02
[58] Field of Search .......... 229/55, 3.5 R, 48 T, 57, 229/DIG. 12, 87 F; 206/65 S, 497; 426/412, 415; 93/35 VL, 35 R; 53/184, 30 S

[56] References Cited

UNITED STATES PATENTS

| | | | |
|---|---|---|---|
| 2,664,358 | 12/1953 | Eichler................................. | 229/57 |
| 2,979,113 | 4/1961 | Stageberg........................ | 229/48 T |
| 3,053,386 | 9/1962 | Schlayer et al.................... | 229/48 T |
| 3,062,373 | 11/1962 | Reynolds ..................... | 229/DIG. 12 |
| 3,478,952 | 11/1969 | Perlman........................ | 229/48 T X |
| 3,516,537 | 6/1970 | Dreyfus et al. ................... | 229/66 X |
| 3,638,790 | 2/1972 | Schmid et al....................... | 206/497 |

Primary Examiner—William I. Price
Assistant Examiner—Stephen P. Garbe
Attorney, Agent, or Firm—James E. Bryan

[57] ABSTRACT

This invention relates to a welded bag of stretched polyester film, comprising a biaxially stretched tubular film with a bottom weld.

2 Claims, 2 Drawing Figures

3,889,870

WELDED POLYESTER BAGS

This invention relates to welded bags formed from biaxially stretched tubular polyester films.

Polyester films, for example polyethylene terephthalate films, previously have been welded to form bags. Superposed portions of film are welded, for example, by means of heated wires or belts, hot air or ultrasonics. The tear strength and elongation at break of welds of bags formed in previously proposed ways are, however, sufficient to only a limited extent in the packaging field, namely as long as the bags and the welds are not subjected to impact loads of any substantial weight. In practice it has been found that in processes for packaging goods which are dropped into the bags, or in packagings which are knocked about repeatedly during transportation, the welds do not withstand the impact loads which thus arise. This means that the welds represent a point of weakness of the packaging which otherwise, being a — preferably biaxially — stretched polyester film, displays high tear strengths and good elongation at break.

The accompanying drawings further illustrate, by way of example only, two different shapes of bag.

Figure 1:
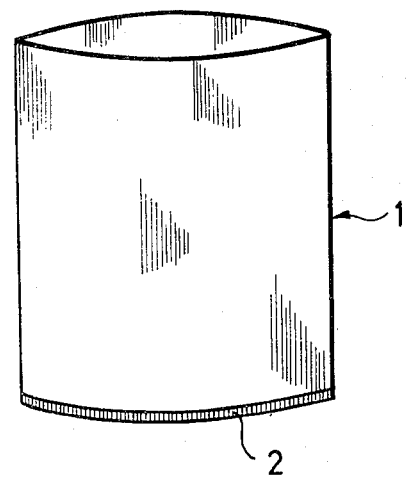

FIG. 1 shows a tube 1 which is open at the top and is provided at the bottom with a curved weld 2.

Figure 2:
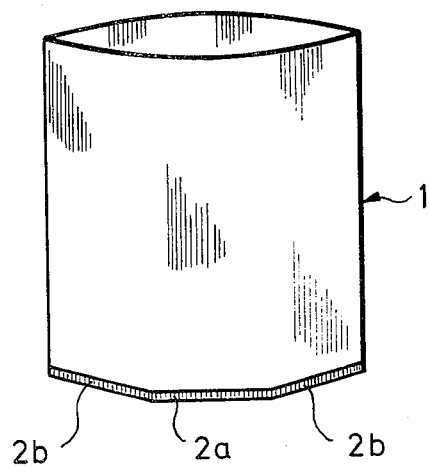

FIG. 2 shows a tube 1 which is open at the top and is sealed at the bottom by the corner welds 2b and the straight weld 2a.

The present invention provides a welded bag of stretched polyester film comprising a tubular film which has been stretched longitudinally and radially and which has a welded bottom.

As a result of the absence of adhesive bonds or welds at the sides, such as are necessary in bags made from flat films, and as a result of the use of polyester tubes which have been biaxially stretched, the bags according to the invention when exposed to load burst less often as compared with bags hitherto known.

As a result of its ability to withstand a higher impact load the bag is suitable, for example, especially for the packaging of meat products which — as, for example, in poultry — are introduced suddenly, i.e., in an impact-like manner, into the preformed bags. During packing, a substantially smaller proportion of bags burst open, as compared to previous bags.

A substantial improvement also was found during the transportation and storage of filled bags, for example in the deep-freezers of supermarkets. Whereas it hitherto frequently occurred that bags broke open, in most cases at the seams, when they were allowed to drop only a few centimeters, for example on introduction into the storage space, bursting open was much reduced in the case of the bag according to the invention, even if the height of drop was significantly greater. These advantages are of importance since they present an advance in counteracting deterioration of the goods resulting from damaged packages.

A further advantage results during shrink-wrapping of goods, wherein considerable shrinkage forces are liberated. Previously proposed bags split open, especially at the longitudinal seams and the goods had to be repackaged, requiring labor and incurring costs. In particular, automatic packaging machines can be operated much better with bags produced according to the invention, since the bags, in view of their high impact resistance, make the running of the machine substantially less prone to faults.

The results observed in practice are also confirmed by measuring the bursting pressure, where increased values up to the point of bursting were found compared to the known bags.

Bags according to the invention also proved superior to the known bags in the drop test, in which sealed bags filled with a specific amount of water were allowed to drop from a predetermined height.

In a preferred embodiment of the invention, the bottom weld is formed as a curved weld in the shape of a semi-circle or a circular segment, or with corners welded off. These shapes of bag are especially suitable for packaging poultry since the bag fits the packaged goods better and does not produce empty protruding corners.

Preferred bags with additionally improved resistance to impact load in the region of the weld are post-stretched in the edge region of the bottom weld. Bags which are post-stretched in orthogonal directions in the region of the weld have proved particularly advantageous in practice. Measurements of bursting pressure showed a further rise in the values withstood up to bursting. Further improvements in the resistance to impact load were also observed in the drop test.

The molecular orientation produced by stretching at the edge regions of the weld, which initially are at least partially amorphous following welding, imparts to the bags a further increase in impact strength. The post-stretching can be effected by means of the known measures for stretching films.

In a preferred embodiment, the bottom weld of the bag has a bead-shaped form which, viewed in cross-section, is drop-like to hemispherical in shape. Such a shape is achieved, for example, if the superposed edges of a length of tube are welded by means of a hot wire, hot gas or the action of a flame. This results in a further improvement in the strength of the weld.

Though all the conventional polyesters can be employed for the bag, those of polyethylene terephthalate have proved of greater value.

It will be obvious to those skilled in the art that many modifications may be made within the scope of the present invention without departing from the spirit thereof, and the invention includes all such modifications.

What is claimed is:

1. A welded bag of stretched polyester film, comprising a biaxially stretched tubular film with a bottom weld, in which the edge region of the bottom weld is post-stretched.

2. A bag as claimed in claim 1 in which the edge region of the bottom weld is post-stretched in orthogonal directions.

* * * * *